(12) United States Patent
Muchin et al.

(10) Patent No.: US 7,448,497 B2
(45) Date of Patent: Nov. 11, 2008

(54) BATTERIES, ACCESSORIES, MARKETING BUNDLES AND MARKETING METHODS

(75) Inventors: Jay Z Muchin, Manitowoc, WI (US); David J. Merten, Manitowoc, WI (US)

(73) Assignee: FCK, LLC., Manitowac, WI (US)

( * ) Notice: Subject to any disclaimer, the term of this patent is extended or adjusted under 35 U.S.C. 154(b) by 668 days.

(21) Appl. No.: 10/748,889

(22) Filed: Dec. 30, 2003

(65) Prior Publication Data

US 2004/0157119 A1 Aug. 12, 2004

Related U.S. Application Data

(60) Provisional application No. 60/436,976, filed on Dec. 30, 2002.

(51) Int. Cl.
*B65D 85/88* (2006.01)
(52) U.S. Cl. .................. 206/705; 206/703; 206/461; 206/459.5
(58) Field of Classification Search ............. 206/463, 206/462, 461, 471, 703, 704, 705, 459.5; 429/149, 156, 157, 163, 99; 40/503, 605
See application file for complete search history.

(56) References Cited

U.S. PATENT DOCUMENTS

| | | | | |
|---|---|---|---|---|
| 2,984,401 A | | 5/1961 | Herkender | |
| 3,424,306 A | * | 1/1969 | Munck | 206/466 |
| 3,796,306 A | * | 3/1974 | Swezey | 206/462 |
| 4,123,598 A | * | 10/1978 | Hammel | 429/159 |
| D250,249 S | | 11/1978 | Flecken | |
| 4,378,068 A | * | 3/1983 | Bell | 206/461 |
| 4,648,013 A | * | 3/1987 | Curiel | 362/183 |
| 5,117,976 A | * | 6/1992 | Whitt et al. | 206/705 |
| 5,429,233 A | * | 7/1995 | Juaristi | 206/705 |
| 5,443,668 A | * | 8/1995 | Zaborney et al. | 156/86 |
| 5,544,745 A | | 8/1996 | Famorca | |
| 5,735,404 A | * | 4/1998 | Kumakura et al. | 206/469 |
| 5,747,192 A | * | 5/1998 | Hughen et al. | 429/163 |
| 5,823,350 A | * | 10/1998 | Ward | 206/705 |
| 5,958,618 A | * | 9/1999 | Sullivan | 429/99 |
| 6,042,113 A | | 3/2000 | Walker | |
| 6,127,024 A | * | 10/2000 | Weiss et al. | 428/204 |
| 6,238,818 B1 | * | 5/2001 | Dalton | 429/96 |
| 6,247,612 B1 | | 6/2001 | Kaufman | |
| 6,386,368 B1 | | 5/2002 | Pirro | |
| 2001/0052478 A1 | | 12/2001 | Casanova et al. | |
| 2002/0149928 A1 | * | 10/2002 | Watterson et al. | 362/184 |
| 2003/0034274 A1 | | 2/2003 | Morita et al. | |

* cited by examiner

*Primary Examiner*—Mickey Yu
*Assistant Examiner*—Steven A. Reynolds
(74) *Attorney, Agent, or Firm*—Rathe Patent & IP Law

(57) ABSTRACT

A battery bundle includes a first battery having a first outer surface with a first graphic, a second battery substantially identical to the first battery in all respects except that the second battery has a second outer surface with a second graphic distinct from the first graphic and a packaging binding the first battery and the second battery.

82 Claims, 5 Drawing Sheets

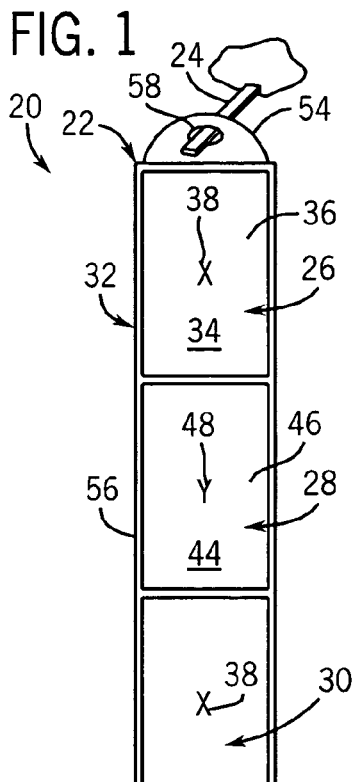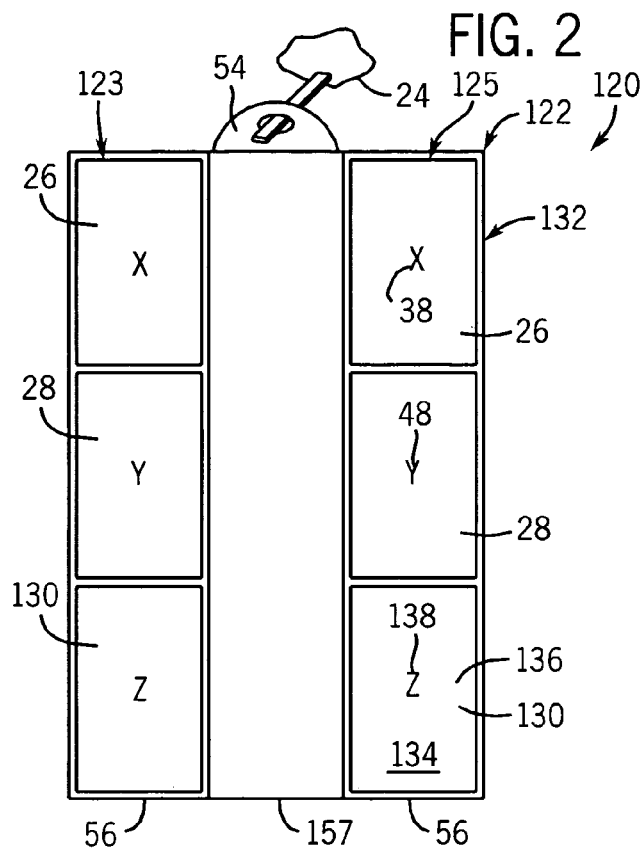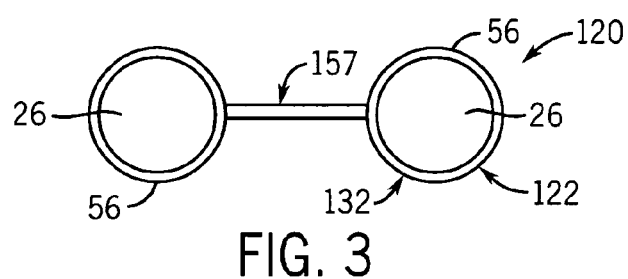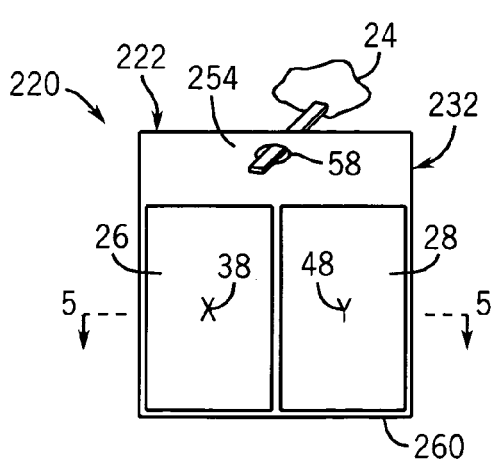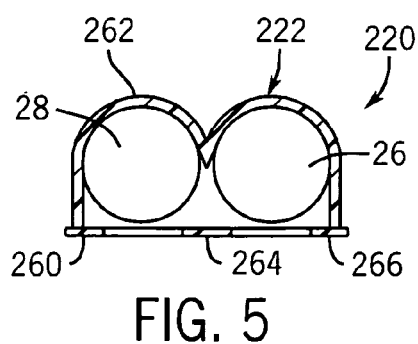

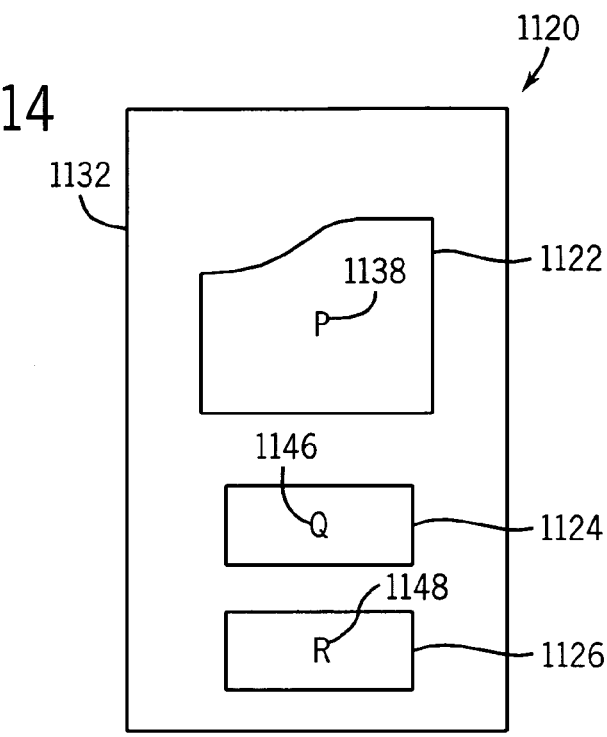
FIG. 14
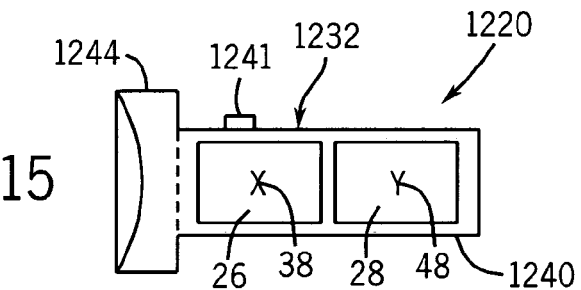
FIG. 15
FIG. 17
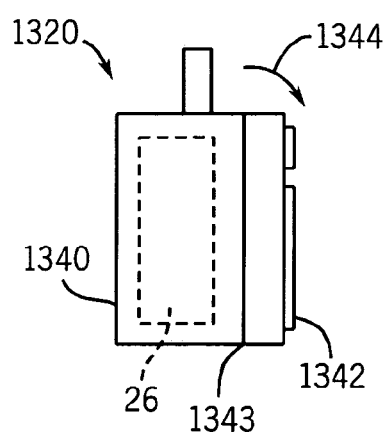
FIG. 16
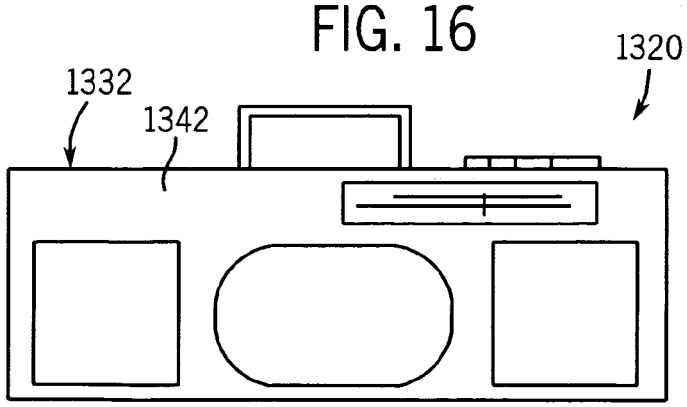

BATTERIES, ACCESSORIES, MARKETING BUNDLES AND MARKETING METHODS

CROSS REFERENCE TO RELATED APPLICATIONS

The present application claims priority under 35 U.S.C. § 119(e) from co-pending U.S. Provisional Patent Application Serial No. 60/436,976 filed on Dec. 30, 2002 by Jay Z. Muchin and David J. Merten entitled BATTERIES, ACCESSORIES, MARKETING BUNDLES AND MARKETING METHODS, the full disclosure of which is hereby incorporated by reference.

FIELD OF THE INVENTION

The present invention relates to batteries, accessories for batteries, electronics that are powered by batteries, product bundles that include batteries and methods for marketing batteries.

BACKGROUND

Batteries, rechargeable and non-rechargeable are used for powering a wide variety of electronics and appliances such as toys, music and video playing devices, flashlights, and the like. General use domestic batteries are either generally cylindrical in shape having positive and negative poles located on opposite ends of the battery (such as size AAA, AA, A, C, and D batteries) or generally rectangular in shape having both the positive and negative poles on one axial end of the battery (such as a 9 volt battery). Such batteries typically include a core surrounded by a wrapper or skin.

The outer surface of the battery typically includes information solely relating to the battery itself. In particular, the outer surface or skin of conventional batteries includes information identifying the manufacturer, distributor or retailer of the battery, providing information regarding the manufacturer, distributor or retailer of the battery, where the battery is manufactured, how to contact the battery manufacturer, distributor or retailer, the address of the manufacturer, distributor or retailer, intellectual property rights obtained for the battery, providing information regarding the recycylability of the battery, displaying one or more trademarks of the manufacturer, distributor or retailer, describing a size (AA, AAA, C, D) or power characteristic (voltage, "25% more powerful", etc.) of the battery, describing a composition of the battery (alkaline, etc.), describing a polarity of the battery (+, −), describing information related to the useful life of the battery (a time period or a date, or "long lasting", etc.), providing warnings regarding the use or disposal of the battery or provide warranty or guaranty information regarding the battery. Typically, batteries having the same source, having the same size and having the same power characteristics also have the exact same outer wrapper or outer skin.

BRIEF DESCRITION OF THE DRAWINGS

FIG. 1 is a front elevation view schematically illustrating a battery display system.

FIG. 2 schematically illustrates an alternative battery display system.

FIG. 3 is an end elevational view of FIG. 2.

FIG. 4 schematically illustrates an alternative battery display system.

FIG. 5 is an end elevational view of FIG. 4.

FIG. 6 schematically illustrates a battery marketing system.

FIG. 7 schematically illustrates an alternative battery display system.

FIG. 8 is a front elevation view schematically illustrating an alternative battery display system.

FIG. 9 schematically illustrates an alternative battery display system.

Figure 12:
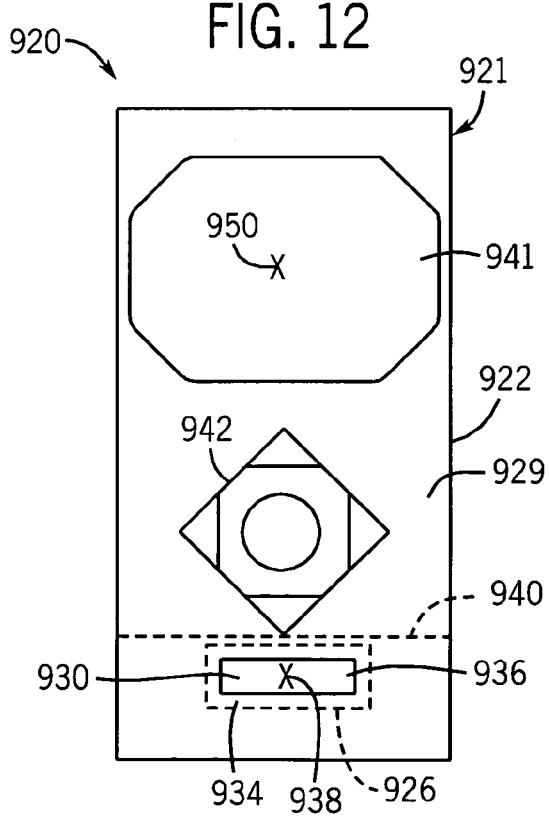

FIG. 12 schematically illustrates an electronic product assembly.

Figure 13:
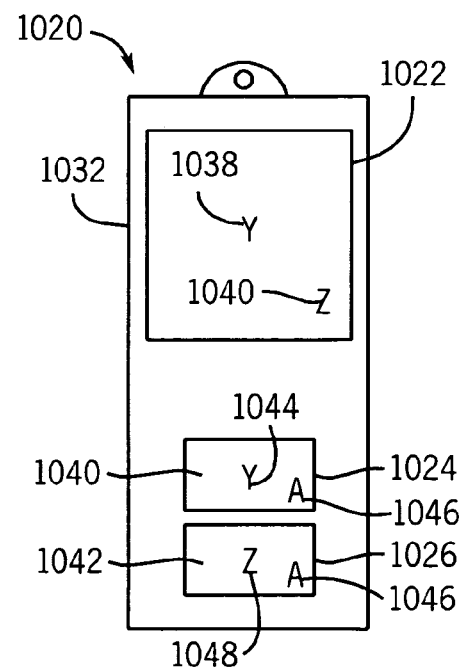

FIG. 13 schematically illustrates a marketing bundle.

FIG. 14 schematically illustrates an alternative marketing bundle.

FIGS. 15-17 illustrate various alternative packaging and storage bundles.

DETAILED DESCRIPTION OF THE PREFERRED EMBODIMENTS

FIG. 1 is a front elevational view schematically illustrating a battery display system 20 generally including a battery bundle 22 and a bundle support 24. Battery bundle 22 is configured for being supported and displayed by support 24 and includes batteries 26, 28, 30, and packaging 32. Battery 26 (schematically shown) generally comprises a conventionally known or future developed battery having an outer surface 34 with an outer graphic 36. For purposes of this disclosure, the term "graphic" means the overall visual appearance on the outside of the battery. The term "graphic" may include alphanumeric symbols such as letters and numbers in different fonts and styles or non-alphanumeric renderings including images or abstract design arrangements. For purposes of this disclosure, the term "image" means a physical likeness or representation of a person, animal, fictional character, landscape, scenery, object or something in actual or imagined existence. The term "abstract design" excludes images and means a graphic that is not intended to represent an actual object, landscape or scene such as polka dots, stripes, color combinations or patterns, zigzags, collages of various items and the like. In each of the embodiments described herein, various letters are used to schematically represent or designate graphic components. Such letters represent the general presence of a graphic component such as one or more alphanumeric symbols, images or abstract designs. The locations of the letters does not necessarily imply the particular location of the graphic components on the outer surface of the battery itself.

In the embodiment shown in FIG. 1, battery 26 is illustrated as including at least one graphic component schematically represented by the letter "X". For purposes of this disclosure, the term "graphic component" means a single symbol or group of symbols, images or abstract designs which are related to one another. For example, a single graphic may consist of several alphanumeric symbols associated with one another to form a word or words that are related to one another and that they provide a common message, i.e., a warning, a distributor address, a power characteristic and the like. A single graphic may include several graphic components. For example, a single graphic may include one graphic component depicting a trademark of the manufacturer, distributor or retailer, a second graphic component identifying the size or power characteristic of the battery, a third graphic component relating to warnings about the use or disposal of a product.

In the particular embodiment illustrated, the outer surface 34 of battery 26 has an overall graphic 36 which includes a graphic component 38. Graphic component 38 may comprise the only graphic component of graphic 36 or may be one of several components forming graphic 36. Unlike conventional battery graphics, graphic 36 includes a graphic component 38 that does not identify a manufacturer, distributor or retailer of the battery, that does not describe a size or power characteristic of the battery, that does not identify an intended or suggested use of the battery such as identifying a type of electronic gadget or appliance in which battery 26 may be used, that does not describe a composition of the battery, that does not describe a polarity of the battery, that is not associated with information regarding the useful life of the battery, that is not associated with warnings about the usage or disposal of the battery, that does not identify intellectual property associated with the battery, and does not provide information regarding the recyclability of the battery. Graphic component 38 also does not identify ideal uses for battery 26. Instead, graphic component 38 comprises one or more alphanumeric symbols, an image or an abstract design, or combinations thereof, that has generally nothing to do with battery 26 itself. Rather, graphic component 38 is specifically chosen so as to target the preferences or tastes of different end users of battery 26.

In the particular embodiments illustrated, graphic component 38 extends across the majority of the overall surface area of outer surface 34. In a most preferred embodiment, graphic component 38 extends across at least 75% of the surface area of outer surface 34. As a result, graphic component 38 constitutes a main visual graphic component of graphic 36 to better target the preferences or tastes of different end users of battery 26. On one particular embodiment, battery 26 has an additional graphic component comprising at least one color (preferably solid) that extends across the entire surface area of outer surface 34 so as to serve as a background for graphic component 38, wherein graphic component 38 overlies the colored background graphic component. In such an embodiment, graphic component 38 preferably covers at least 50% of the surface area of outer surface 34. Although less desirable, graphic component 38 may cover a smaller percentage of surface 34.

The selection of graphic component 38 is part of an overall method for marketing batteries which involves identifying the first preference for a first group of end-users or consumers, identifying a second preference for a second group of end-users or consumers, offering for sale a first battery having a first exterior graphic chosen based upon the first identified preference, and offering for sale a second battery identical to the first battery except that that second battery has a second graphic based upon the second identified preference. The groups of consumers may be distinguished based upon gender, based upon age or age characteristics, based upon geographical regions of the consumers, based upon the jobs or professions of the consumers, based on the education level of the consumers, based upon participatory hobbies ("participation in athletics such as biking, football, jogging, skateboarding, etc.", collecting, hunting, working out/body building, playing cards, playing bingo, camping, motorcycle riding, etc.), social clusters, demographics, ethnicities, religions, nationalities, observational hobbies ("interests in observational participation in distinct forms of entertainment such as watching sports, TV, concerts, movies, plays, pornography, political shows or events, etc."), social behavior (fine wine, cigars, fashion preference, gambling, sex, sexual preference or behavior, adult entertainment, bars, dance clubs, etc.), habitual behavior (smoking, drinking, drug use, etc.), clubs/memberships/affiliations (fraternities, Kiwanis, Harley Davidson owners, sports team, musical group, thespian, religious subchapter, alcoholics anonymous, YMCA, pro-life, political party or cause, etc.), physical characteristics (hair color, muscularity, hair style, weight, attractiveness, skin color, etc.), or based upon the characteristics of consumers who regularly shop at particular retail shopping sources in which the consumers purchase batteries. For example, battery 26 may be provided with a first graphic component 38 when targeting teenagers or while battery 26 may be provided with a second distinct graphic component 38 when targeting senior citizens. Battery 26 may have a first graphic component 38 when targeting men and second graphic component when targeting women. Battery 26 may have a first graphic component when targeting New Yorkers and a second graphic component when targeting consumers in California. Battery 26 may have a first graphic component 38 when targeting housewives and a second graphic component when targeting college students or construction workers. Battery 26 may have a first graphic component 38 when targeting individuals who shop at malls and a second distinct graphic component 38 when targeting individuals who shop at department stores. For example, two different batteries may target teens, one targeting teens who like punk music while the other targeting teens who like watching football. Further, one could target teens who like punk music while the other targets teens who like rap music. Examples of different graphics 36 having one or more graphical components 38 targeting teenagers are provided in Exhibit A attached hereto.

Graphic component 38 may also be a part of another overall method for marketing batteries in which graphic component 38 is chosen based upon the expected use of battery 26. This method involves identifying a first battery use, identifying a second battery use, offering for sale a first battery having a first graphic chosen based upon the first identified use and offering for sale a second battery identical to the first battery except that the second battery has a second graphic distinct from the first graphic and chosen based upon the second identified use. This graphic would not depict the actual electronic component or appliance in which the battery is to be used, such as a flashlight, walkman or the like, but rather includes at least one graphic component chosen based upon the identified use. For example, batteries targeted for use in a walkman, CD player or other music-playing device may include images of recording artists, CD music labels or album artwork and the like. Alternatively, batteries targeted for use in video game players such as GAME BOY and the like may have graphic components 38 including images of popular video game characters or slogans. In yet another marketing approach, batteries 26 may be provided with graphic components 38 for advertising or promoting other products or services unrelated to batteries, upcoming events, political candidates and the like.

Alternatively, batteries 26 may be provided with one or more graphic components 38 related to or associated with other items that are commonly collected. For example, graphic component 338 may be associated with Harley Davidson, Elvis Presley, Green Bay Packers, NFL football team and the like, wherein the individuals collecting items associated with a particular topic may also collect battery 26. For purposes of the description, the term associated or related, generally refers to those items which end consumers would normally recognize as being associated or related to something else. For example, an image of the motorcycle may be associated with Harley Davidson, whereas the image of a guitar may be associated with Elvis Presley. An image of Lambeau Field may be associated with the Green Bay Packers. As will be described hereafter, batteries 26 may be provided with graphic components 38 chosen to facilitate collectability or to cooperate with graphic components provided on other batteries to form composite graphics or to create an overall visual impression employing the multiple distinct graphic components.

Battery 28 is substantially identical to battery 26 except that battery 28 has an outer surface 44 with an outer graphic 46 having a graphic component 48 (schematically designated by the letter "Y"). Graphic component 48 is different or distinct from graphic component 38. As a result, batteries 26 and 28 are visually distinguishable from one another. As a result, several benefits follow. First, the replacement of depleted batteries with fresh batteries is easier. In particular, with conventional batteries, the consumer may become confused as to which batteries are depleted and which batteries are fresh during the replacement of batteries since conventional batteries from the same source generally have identical graphics, or at least the overwhelming majority of the graphics appear to be identical. This frequently leads to fresh batteries accidentally being thrown away. Because batteries 26 and 28 have distinct graphic components 38 and 48, the consumer can more easily distinguish between a depleted battery 26 and a fresh battery 28 during replacement of batteries.

Second, the distinct graphic components 38 and 48 of batteries 26 and 28, respectively, facilitates easier evaluation of electronics and appliances. Many times, defective operation of an electronic appliance may either be the result of depleted batteries or the electronic product or appliance itself malfunctioning. To evaluate the electronic appliance, the existing batteries are removed and fresh batteries are deposited in the appliance. Unfortunately, with conventional batteries having identical graphics, old and new batteries are mixed, preventing accurate testing for the cause of the appliance malfunction. Because graphic components 38 and 48 are visually distinct from one another, the correct insertion of fresh batteries into the appliance being tested is facilitated, enabling accurate conclusions to be reached regarding the cause of the malfunction.

Battery 30 is identical to battery 26 in substantially all respects. Battery 30 has the same graphic component 38 as battery 26.

Packaging 32 binds batteries 26, 28 and 30 together into a single bundle or package. Packaging 32 generally includes a support portion 54 and a battery binding portion 56. Support portion 54 is configured to engage support portion 24 of display 20. In the particular embodiment illustrated, support portion 54 comprises a flap or card extending from an upper portion of binding portion 56. In the particular embodiment illustrated in which hang portion 24 comprises a post or peg, support portion 54 includes a hang hole, notch or similar structure 58 through which support portion 24 extends to hang battery bundle 22. In alternative embodiments, support portion 54 may comprise a pedestal or base located on a bottom end of binding portion 56 for standing or resting battery bundle 22 on a shelf or other flat surface. In still other embodiments, support portion 54 may be omitted.

Binding portion 56 groups batteries 26, 28 and 30 together in a bundle for distribution, retail sale and storage. In the particular embodiment illustrated, binding portion 56 comprises an elongate tube configured to contain batteries 26, 28 and 30 in an end-to-end arrangement. In the particular embodiment illustrated where batteries 26, 28 and 30 each have a generally cylindrical shape, binding portion 56 also comprises a cylindrical shaped tube. In alternative embodiments where batteries 26, 28 and 30 have a generally rectangular shape, such as with E batteries, binding portion 56 may comprise a tube having a generally rectangular cross-section.

In the embodiment illustrated, binding portion 56 further facilitates viewing of the images of the graphics of batteries 26, 28 and 30 and in particular, graphic components 38 and 48. In one embodiment, the tube comprising binding portion 56 includes appropriately sized and located apertures to enable viewing of components 38 and 48. In another embodiment, binding portion 56 includes transparent portions which are appropriately sized and located to facilitate viewing of graphic components 38 and 48. In the most preferred embodiment, substantially the entire circumferential surface of the cylindrical or rectangular tube forming binding portion 56 is transparent to facilitate viewing of the entire outer surfaces of batteries 26, 28 and 30 (excluding the axial ends of the batteries).

Although binding portion 56 is illustrated as a generally linear tube, binding portion 56 may alternatively have a tubular configuration of various other shapes. For example, binding portion 56 may comprise a single elongate tube forming a letter, number or other symbol. In such an application, the selection of the letter, symbol or other design for the binding portion 56 may be chosen to target particular consumers. For example, binding portion 56 may be in the shape of a capital "M" wherein the individual batteries have images or colors chosen that are associated with an organization employing the symbol "M", such as the University of Michigan. Binding portion 56 may alternatively have a candy cane shape, wherein the graphics of the batteries contained therein are striped to target the sale of batteries at Christmas time.

FIGS. 2 and 3 schematically illustrate an alternative battery display system 120 including battery bundle 122 and support 24. FIG. 2 is a front elevational view of system 120, while FIG. 3 is an end elevational view of system 120. Battery bundle 122 includes a first end-to-end arrangement 123 of batteries 26, 28 and 130 and a second end-to-end arrangement 125 of batteries 26, 28 and 130, and packaging 132. Batteries 26 and 28 are identical to batteries 26 and 28 discussed with respect to FIG. 1. Batteries 130 are substantially identical to batteries 26 and 28, except that batteries 130 have an outer surface 134 with an outer graphic 136 having a graphic component 138 (schematically represented by the letter "Z"). Graphic component 138 is visually distinct from graphic components 38 and 48. In the particular embodiment illustrated, graphic component 138 comprises a non-alphanumeric design such as an abstract design or an image. Graphic component 138 is not associated with a trademark or trade dress (i.e., a common color scheme identifying a brand, manufacturer, retailer or distributor of the battery) of the source (i.e. manufacturer, distributor or retailer) of battery 130.

Packaging 132 binds batteries 26, 28 and 30 together in the arrangement shown. Package 132 generally includes binding portions 56 joined by an intermediate display panel 157 and support portion 54. For ease of discussion, every component which is identical or substantially identical to other components previously described are numbered similarly. Display panel 157 extends between binding portions 56 and generally comprises a flat card or panel configured to display additional information regarding batteries 26, 28 and 130.

FIGS. 4 and 5 illustrate battery display system 220, an alternative embodiment of display systems 20 and 120. System 220 includes batteries 26, 28 and packaging 132. Batteries 26 and 28 are described above. Packaging 132 generally includes card or back panel 260, front encasement 262 (shown in FIG. 5). Panel 260 generally comprises a rigid plastic or paper. Panel 260 preferably extends beyond batteries 26 and 28 so as to provide a support portion 254 having an aperture 58 by which bundle 222 may be hung from support 24. Alternatively, support portion 254 may comprise a pedestal or support portion 254 may be omitted.

Top or upper encasement 262 generally comprises a transparent polymeric structure coupled to panel 260 and extending about batteries 26 and 28. In one embodiment, top encasement 262 is sufficiently rigid so as to maintain its shape even in the absence of batteries 26 and 28. In another embodiment, top encasement 262 is thinner and more flexible, such as a film, so as to only maintain its shape when batteries 26 and 28 are in place.

As best shown by FIG. 5, panel 260 extends behind both batteries 26 and 28 and is preferably formed from an opaque material such as paperboard. As a result, panel 260 partially conceals the outer circumferential surface of batteries 26 and 28 which are preferably cylindrical in shape. To facilitate viewing of the entire outer surface of batteries 26 and 28, panel 26 additionally includes viewing mechanisms for enabling batteries 26 and 28 to be manipulated or moved while within packaging 232. FIG. 5 illustrates two such manipulation mechanisms. In particular, FIG. 5 illustrates panel 260 as including aperture 264 and membrane 266. Aperture 264 extends through panel 260 and is appropriately configured and located so as to enable the consumer to directly physically contact battery 28 to enable the consumer to rotate battery 28 within the packaging to view the entirety of the outer surface of battery 28.

Membrane 266 generally comprises a portion of panel 26 which is formed from a flexible material. Membrane 266 is sufficiently flexible so as to enable membrane 266 to be inwardly flexed or deformed into contact with battery 26 and to be moved so as to cause battery 26 to be rotated within packaging 232.

Although aperture 264 and membrane 266 are illustrated as being provided as part of panel 260, aperture 264 and membrane 266 may alternatively be provided or formed as part of top encasement 262. In yet other alternative embodiments, other means may be employed to facilitate movement or rotation of batteries 26 and 28 within packaging 232. For example, packaging 232 may be provided with a crank having one or more surfaces in engagement with an axial end of either battery 26 or 28, wherein rotation of the crank rotates the battery. In another alternative embodiment, portions of panel 260 may be provided with sliding or pivoting flaps which may be moved to facilitate viewing of the rear side of batteries 26 and 28.

Figure 6:
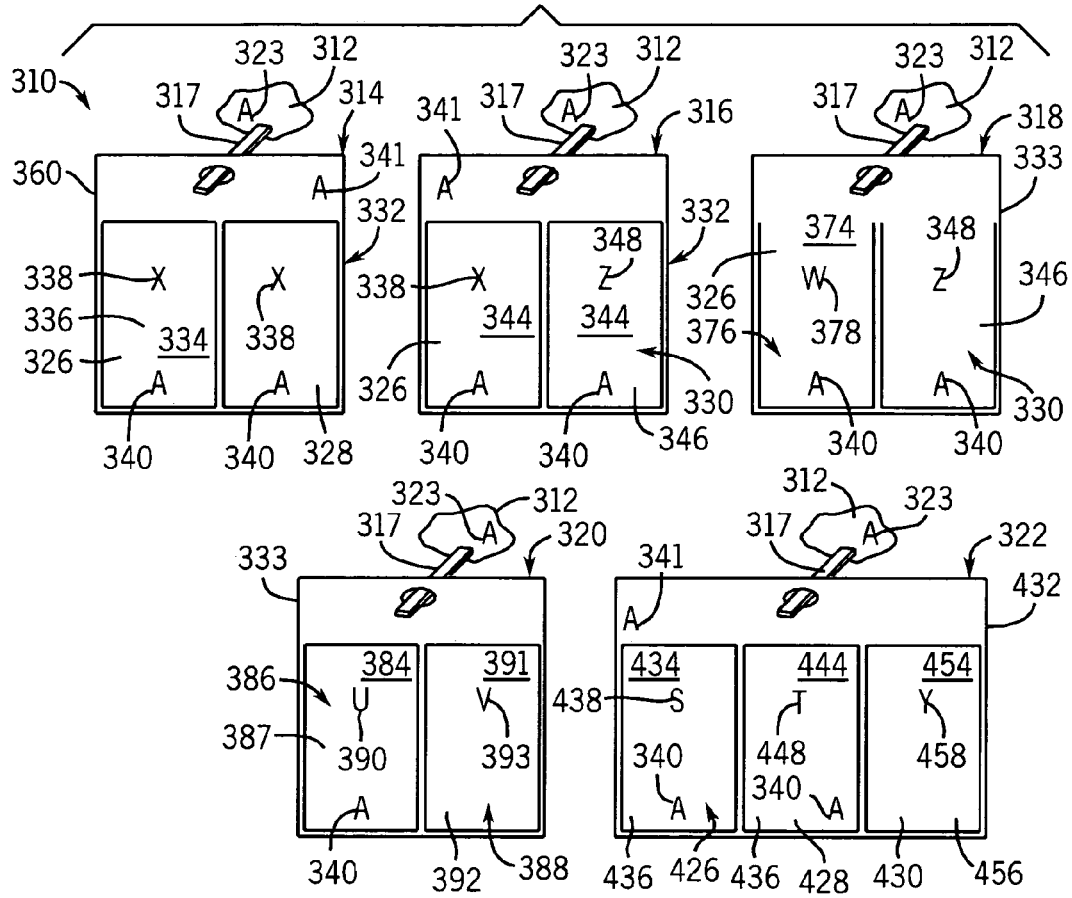

FIG. 6 schematically illustrates a battery marketing system 310 including an overall display structure 312 and a plurality of battery bundles 314, 316, 318, 320 and 322. Display structure 312 generally comprises one or more panels configured to support a plurality of battery bundles. Such panels may be provided with indicia 323, schematically represented by the letter "A", identifying the source of the battery bundles. In the particular embodiment illustrated, display panel 312 comprises a single stand having a plurality of support pegs or posts 317 from which the battery bundles may be hung. Display structure 312 may additionally or alternatively include a basket-like structure configured to receive and display battery bundles. In yet another embodiment, display structure 312 may comprise a plurality of rows in which battery bundles are stacked in a face-to-face relationship such that the front of each bundle faces the rear side of a forward adjacent bundle. In such an arrangement, means may be provided behind the rearward most bundle for pushing the horizontal stack or row of bundles towards the front of the shelf.

Battery bundle 314 generally includes batteries 326, 328 and packaging 332. Battery 326 generally comprises a general domestic use battery (size AAA, AA, A, C, D, E, 9 volt and the like) having an outer surface 334 with an image 336. Image 336 includes a first graphic component 338 schematically represented by the letter "X" and a second graphic component 340 schematically represented by the letter "A". Graphic component 338 is preferably configured so as to be unrelated to battery 326 in that graphic component 330 does not identify a manufacturer, distributor or retailer of the battery, that does not describe a size or power characteristic of the battery, that does not identify an intended or suggested use of the battery such as identifying a type of electronic gadget or appliance in which battery 26 may be used, that does not describe a composition of the battery, that does not describe a polarity of the battery, that is not associated with information regarding the useful life of the battery, that is not associated with warnings about the usage or disposal of the battery, that does not identify intellectual property associated with the battery (for example, a patent number, a patent pending notification, a trademark symbol (™, ®), a copyright symbol (©)), and does not provide information regarding the recyclability of the battery. Graphic component 38 also does not identify ideal uses for battery 26. Although less desirable, in some embodiments, graphic component 330 may alternatively be associated with information pertaining to the characteristic of battery 326. For example, graphic component 330 may less desirably comprise a trademark logo or a trademark design.

Graphic component 340 generally comprises indicia identifying a source of battery 326. For example, graphic component 340 may comprise a rendering in the form of a name, a logo or design, and the like. Graphic component 340 represents either the distributor, manufacturer or retailer of battery 326 or bundle 314. In one embodiment, graphic component 340 comprises alphanumeric symbols forming the name of the manufacturer, distributor or retailer. In a most preferred embodiment, graphic component 340 comprises alphanumeric symbols forming words spelling out the manufacturer or brand name of battery 326.

Battery 328 is identical to battery 326 in that battery 328 also includes graphic components 338 and 340.

Packaging 332 binds batteries 326 and 328 to one another to form a bundle. Packaging 332 generally includes panel 360 formed from paperboard or plastic and front encasement 262 (shown in FIG. 5). Panel 360 and encasement 262 cooperate to surround and encase batteries 326 and 328. Encasement 262 is preferably transparent. Although encasement 262 is illustrated as surrounding two batteries 326 and 328, encasement 262 may alternatively be configured to hold greater than two batteries wherein the batteries are all grouped together in a single enclosure. Although bundle 314 is illustrated as having packaging 332 comprising a panel 360 and an encasement 262, packaging 332 may alternatively comprise other packaging structures such as packaging 32, 132 and 232. As shown by FIG. 6, packaging 332 additionally includes indicia 341 identifying the source of bundle 314 and batteries 326, 328 placed upon cards 360 as schematically represented by the letter "A".

Battery bundle 316 is substantially identical to battery bundle 314 except that battery bundle 316 includes a battery 330 in lieu of battery 328. Battery 330 is substantially identical to battery 326 as well as battery 328 and all respects, except that battery 330 has an outer surface 344 having a graphic 346 including graphic components 340 and 348. Graphic component 340 is the same as graphic component 340 of batteries 326 and 328. Graphic component 348 is visually distinct from graphic component 338. In the embodiment illustrated, graphic component 348 comprises either an alphanumeric component, an abstract design or an image, or a combination thereof, unrelated to the characteristics of the battery 346 itself. Although less desirable, component 348 may additionally provide information regarding the battery.

In one embodiment, graphic components 338 and 348 are generally selected so as to target a common group. For example, graphic components 338 and 348 are selected to target teenagers who like punk rock. Graphic component 338 may comprise an image of a first punk rock group or band while graphic component 348 may comprise a second image either of the same punk rock group or band or a different punk rock band. Alternatively, graphic components 338 and 348 may target different groups.

Battery bundle 318 is identical to battery bundle 316 except that battery bundle 318 includes battery 376 in lieu of battery 326. Like batteries 326 and 328, battery 376 includes an outer surface 374 having an overall graphic 376 including a graphic component 340. However, unlike batteries 326, 328 and 330, battery 376 additionally includes a graphic component 378, schematically represented by the letter "W", visually distinct from graphic components 338 and 348. In the embodiment illustrated, battery 376 has a different size, as well as a different power characteristic as compared to battery 330. In alternative embodiments, battery 376 is substantially identical to battery 330 in all respects (including power and size) except for its distinct graphic 376 including graphic component 378.

Battery bundle 320 is substantially identical to battery bundles 316 and 318 except that battery bundle 320 includes batteries 386 and 388 in lieu of batteries 376 and 330. Like battery bundle 318, battery bundle 320 includes packaging 332 which omits indicia 341 provided on bundles 314 and 316. Battery 386 is substantially identical to battery 330 in all respects except that battery 386 has an outer surface 384 having a graphic 387 including graphic components 340 and 390. Graphic component 390 is visually distinct from graphic components 338, 348 and 378. Graphic component 390 comprises one or more alphanumeric symbols, an abstract design or an image unrelated to characteristics of battery 386. In the particular embodiment illustrated, graphic component 390 comprises an abstract design or an image. Although less desirable, graphic component 390 may additionally provide information relating to the characteristics of battery 386.

Battery 388 is substantially identical to battery 386 in all respects except that battery 388 includes an outer surface 391 having an image 392 including graphic component 393, schematically represented by the letter "V". Graphic component 393 is visually distinct from graphic component 338, graphic component 348, graphic component 378 and graphic component 390. Unlike graphic 387 of battery 386, graphic 392 of battery 388 does not include any graphic component or indicia providing information regarding the characteristics of battery 388 itself.

Battery bundle 322 generally includes batteries 426, 428, 430 and packaging 432. Battery 426 is substantially identical to each of batteries, 326, 328, 376, 330, 386 and 388 in all respects except that battery 426 has an outer surface 434 having an overall graphic 436 including graphic component 438, schematically represented by the letter "S". Battery 428 is substantially identical to battery 426 except that battery 428 has an outer surface 444 including an overall image 446 including a graphic component 448, schematically represented by the letter "T". Battery 430 is substantially identical to batteries 426 and 428 in all respects except that battery 430 includes an outer surface 454 having an overall image 456 including graphic component 458, schematically represented by the letter "X", and omitting graphic component 340. Graphic components 438, 448 and 458 are visually distinct from one another. Graphic components 438, 448 and 458 preferably comprise one or more alphanumeric symbols, abstract designs or images unrelated to the characteristics of batteries 426, 428 and 430, such as their size, their power characteristics, their manufacturer, distributor or retailer, and the like.

Graphic components 438, 448 and 458 are preferably configured so as to extend substantially from a first axial end to a second opposite axial end of the respective batteries and so as to also extend substantially about the entire outer surface of the battery. In one preferred embodiment, graphic components 438, 448 and 458 extend 360° about the outer surfaces 434, 444 and 454, respectively. Although less desirable, graphic components 438, 448, 458 may alternatively extend 180° or only 90° about outer surfaces 434, 444 and 454. The extent to which graphic components 438, 448 and 458 extend about batteries 426, 428 and 430 applies regardless of whether batteries 426, 428 and 430 are cylindrical in shape or rectangular in shape (such as a size 9 volt battery).

Packaging 432 is substantially identical to packaging 332 except that packaging 432 is configured to bind three batteries 426, 428 and 438 together in a single package. Although packages 332 and 432 are illustrated as binding two batteries and three batteries, respectively, packaging 332 or packaging 432 may alternatively be modified to bind a larger number of batteries together.

Figure 7:
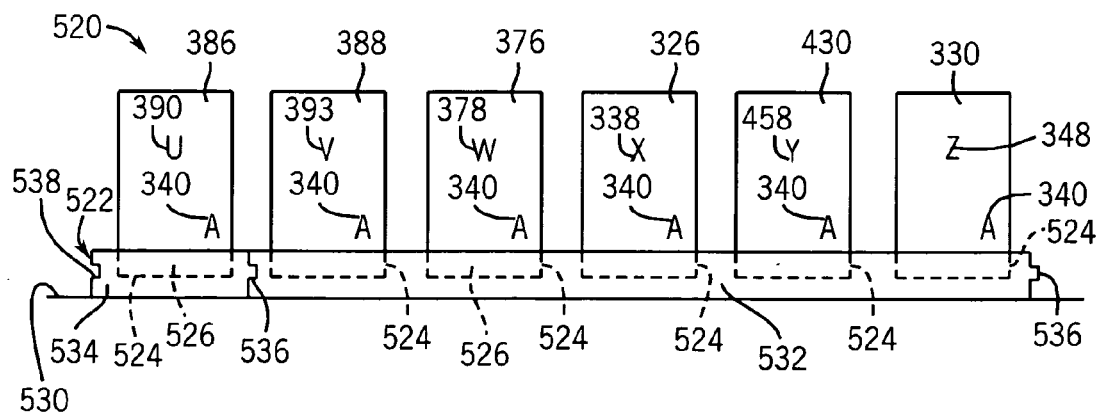

FIG. 7 schematically illustrates a battery display system 520. System 520 generally includes batteries 326, 330, 376, 386, 388 and 430, previously described. System 520 additionally includes a display apparatus 522 configured to engage and support a plurality of batteries relative to one another in a spaced-apart relationship. In the particular embodiment illustrated, display apparatus 522 includes a plurality of battery-engaging portions 524 which engage the plurality of batteries and support the plurality of batteries. In the embodiment shown, battery-engaging portions 524 comprise cavities or depressions configured to receive an axial end portion 526 of the batteries such that the longitudinal axes of the batteries extend generally perpendicular to apparatus 522. In the embodiment illustrated, apparatus 522 serves as a base which is configured to rest upon a surface 530 such that the longitudinal axes of the batteries extend perpendicular to surface 530. Because battery-engaging portions 524 support the batteries in a substantially perpendicular relationship to surface 530, the batteries are more prominently displayed for enjoinment of the graphics thereon. In yet alternative embodiments, battery-engaging portions 524 may alternatively be configured as depressions or cavities so as to receive a portion of the outer surfaces of the batteries that extend between the axial ends. Although less desirable, apparatus 522 may alternatively be formed as a single structure without the capability of add-ons.

As further shown by FIG. 7, apparatus 522 preferably includes a plurality of portions 532, 534 which are releasably coupled to one another. As a result, the number of batteries which apparatus 522 is capable of supporting and displaying may be increased or decreased as desired. In the particular embodiment illustrated, portions 532 and 534 include releasably interlocking tongue and groove portions 536. Various other conventionally known or future developed interlocking snap fit type mechanisms may also be employed.

Apparatus 522 may be employed for multiple purposes. First, apparatus 522 may be used to support the batteries at a retail point of sale to best display the graphics of the batteries.

In such an application, shrink wrap or other cellophane may be employed to secure the batteries within the display apparatus 522. Second, apparatus 522 may be employed to store fresh or unused batteries. In those embodiments where display apparatus 522 may be enlarged or reduced in size, the consumer can modify the size of device 522 to conserve space or to store additional batteries. Third, apparatus 522 may be used to display fresh unused batteries or used batteries since such batteries preferably have graphics targeted to the individual consumer. For example, each of batteries 326, 330, 376, 386, 388 and 430 may have graphic components which are worthy of display. In one application, the batteries may have graphic components comprising large letters, wherein words or phrases can be spelled using multiple batteries in selected orders on apparatus 522. In one particular application, prizes or other rewards may be offered by the source of the batteries (manufacturer, distributor, retailer and the like) for obtaining and collecting selected batteries having graphic components that spell out an individual word or phrase. In another embodiment, the batteries, when supported side-by-side by display 522, may form a composite graphic. In still other applications, apparatus 522 may be used to display a collection of batteries having different graphics. In another embodiment, the batteries, when supported side-by-side by display 522, may be used to display a collection of batteries having a related theme, or to create a series. For example, each of the graphic components provided on batteries 326, 330, 376, 386, 388 and 430 have graphic components depicting a plot or story line, such as frames in a comic book. In other applications, each of the graphic components may be configured to display a series of related patterns, such as a common pattern or abstract design but with different color combinations. In other embodiments, graphics may be provided on the batteries so as to display other related items such as related phrases (a multitude of different motivational phrases, Spanish words and the like). The graphic components provided on each of the batteries may be related to one another or may have a common relationship or denominator. For example, batteries 326, 330, 376, 386, 388 and 430 may have graphic components relating to a common genus. In one embodiment, each of the batteries may be provided with a distinct graphic corresponding to a candy bar wrapper. In still another embodiment, each of the batteries may be provided with a distinct graphic component associated with Walt Disney, such as licensed Disney characters (Mickey Mouse, Winnie the Pooh, Cinderella, Little Mermaid and the like). In embodiments where apparatus 522 is expandable, the size of the collection or the image may be boundless.

Figure 8:
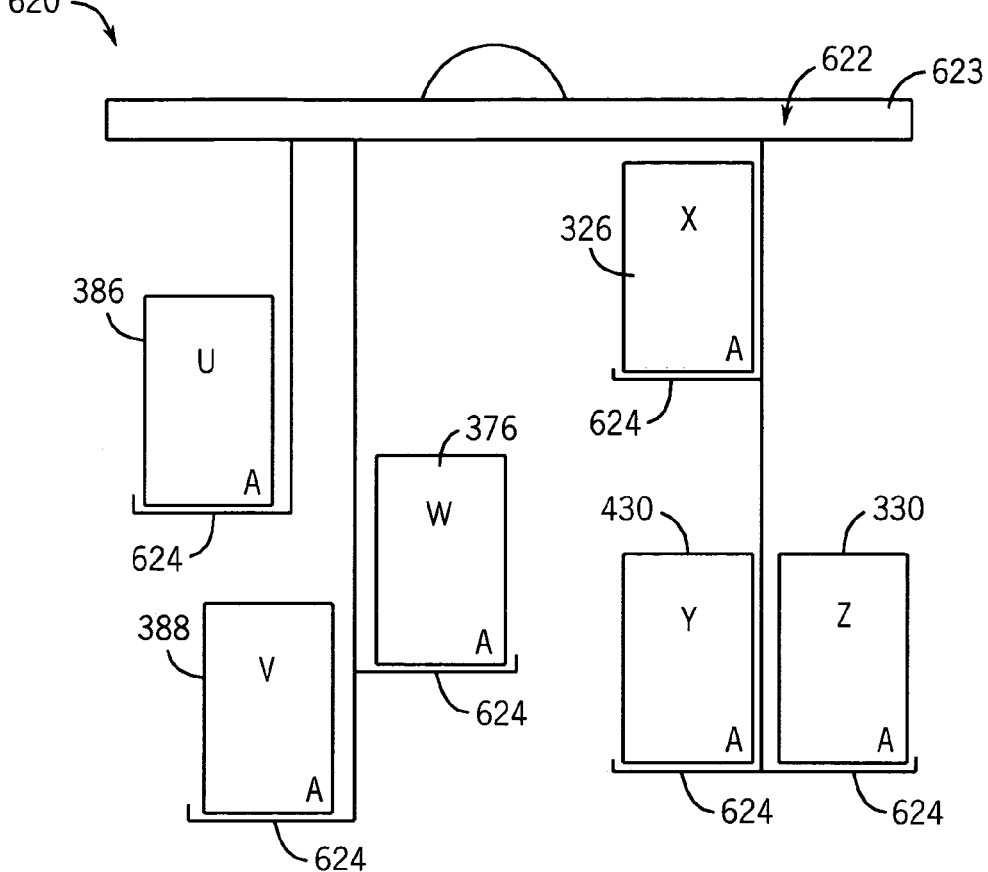

FIG. 8 is a front elevational view schematically illustrating battery display system 620 including batteries 326, 330, 376, 386, 388 and 430, and display apparatus 622. Display apparatus 622 generally includes a base 623 and battery engaging portions 624. Battery engaging portions 624 extend from base 623 and serve as a platform or shelf for supporting the batteries. Base 623 generally comprises a structure for being mounted to a wall or being hung from a ceiling or other surface. In one embodiment, battery engaging portions 624 and base 623 are sufficiently flexible or are configured to rotate so as to function as a mobile. In an alternative embodiment, engaging portions 624 are sufficiently rigid, wherein apparatus 620 serves as a display shelf.

Figure 9:
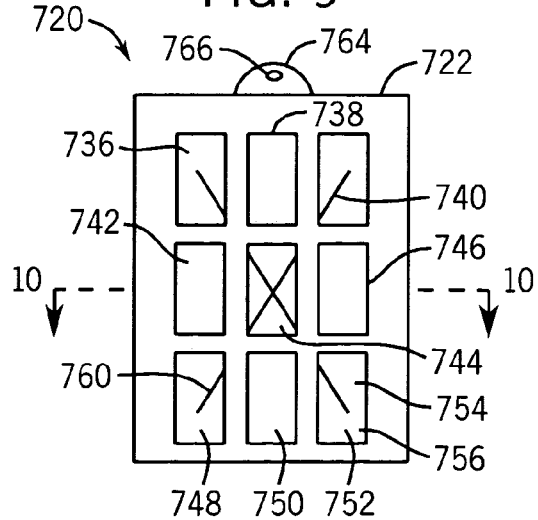
Figure 10:
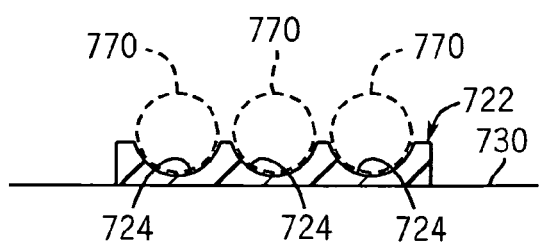
FIG. 10 is an end elevational view of FIG. 9.

FIGS. 9 and 10 illustrate battery display system 720. FIG. 9 is a top elevational view schematically illustrating system 720 including batteries 736, 738, 740, 742, 744, 746, 748, 750 and 752 and display apparatus 722. Batteries 736-752 have outer surfaces 754 with images 756 that are configured to collectively form a composite graphic 760 (schematically represented by the letter "X") when positioned proximate to one another in a selected order and arrangement. Composite graphic 760 may comprise one or more alpha-numeric symbols, an abstract design or one or more images. In one embodiment, batteries 736-752 may have outer surfaces 754 with individual graphic 756 configured such that repositioning of one or more of batteries 736-752 modifies composite graphic 760 or creates an entirely different composite graphic 760. For example, batteries 736-752 may be configured such that displaying a first side of each of the batteries produces a first composite graphic 760 while positioning the batteries such that the opposite sides face upward produces a completely distinct composite graphic 760.

Although composite graphic 760 is illustrated as being formed by nine batteries, display system 720 may alternatively include a fewer or greater number of such batteries. Although composite graphic 760 is illustrated as being formed solely by the graphics 756 upon the outer surfaces 754 of the batteries, composite graphic 760 may alternatively be formed by the combination of the graphics 756 provided on the batteries and additional graphics provided on one or more surfaces of display apparatus 722. Although the composite graphic 760 preferably utilizes all of the batteries supported by apparatus 722, composite graphic 760 may alternatively be provided by only a portion of the total number of batteries supported by apparatus 722.

FIG. 10 illustrates display apparatus 722 in greater detail. As best shown by FIG. 10, apparatus 722 generally includes a plurality of battery engaging portions 724 configured to retain batteries 736-752 in place relative to one another. In one embodiment, portions 724 comprise semi-cylindrical shaped depressions or cavities configured to receive the sides of batteries 736-752. Portions 724 may be configured to support batteries 736-752 in a somewhat spaced apart relationship as shown in FIG. 9 or in an abutting relationship.

In one embodiment, apparatus 722 is configured to rest or lie upon a horizontal surface 730. In another application, apparatus 722 may additionally or alternatively include a mounting portion 764 configured to hang apparatus 722. In an alternative embodiment, mounting portion 764 may be provided along a back side of apparatus 722 and may comprise a toothed rack, a wire or a hang hole 766 as shown.

In particular embodiments, portions 724 may additionally be configured or include other mechanisms for retaining batteries 736-752 in a secured relationship to apparatus 722 to prevent accidental dislodgment of the batteries from apparatus 722 when apparatus 722 is hung in a vertical orientation and the like. In one embodiment, portions 724 may be specifically dimensioned so as to tightly grip and grasp portions of the batteries to retain them in place. In another embodiment, apparatus 722 may be provided with elastic straps or bands 770 (shown in FIG. 10) which are configured to hold the batteries in place. In alternative embodiments, bands 770 may be utilized in lieu of the cavities provided by portions 724. In still other embodiments, system 720 may be provided with two sided tape, VELCRO (wherein one portion of the VELCRO is adhered to the battery and the other portion of the VELCRO is adhered or provided as part of apparatus 722) or other mechanisms for securely retaining the batteries in place.

Apparatus 722 enables batteries 736-752, forming composite image 760, to be utilized in a variety of fashions. First, apparatus 722 may be used at a point of retail sale to display the batteries and composite image 760. Apparatus 722 may also be used to display fresh or exhausted batteries as a piece of art. Third, apparatus 722 may serve as a base of a puzzle which requires the user to appropriately position the various batteries to form the composite image 760. In one embodiment, a reference numeral or graphic thumbnail is printed, embossed or otherwise formed at each of the locations for batteries 736-752 to identify the proper location of each of batteries 736-752. In a more complex embodiment, apparatus 722 may include one or more battery engaging portions which engage either the axial ends of the batteries or the sides of the batteries and which are rotatably driven to rotate the batteries while the batteries remain coupled to apparatus 722. For purposes of this description, the term "coupled" shall mean the joining of two members directly or indirectly to one another. Such joining may be stationary in nature or movable in nature. Such joining may be achieved with the two members or the two members and any additional intermediate members being integrally formed as a single unitary body with one another or with the two members or the two members and any additional intermediate member being attached to one another. Such joining may be permanent in nature or alternatively may be removable or releasable in nature. Rotation of the batteries may be in a timed fashion to produce a multitude of different composite images or may be employed with batteries having graphics that do not form a composite image, but when rotated create a unique visual result. The rotation of the batteries may be provided by conventionally known or future developed motors having appropriate gearing to rotatably drive the battery engaging portions.

Figure 11:
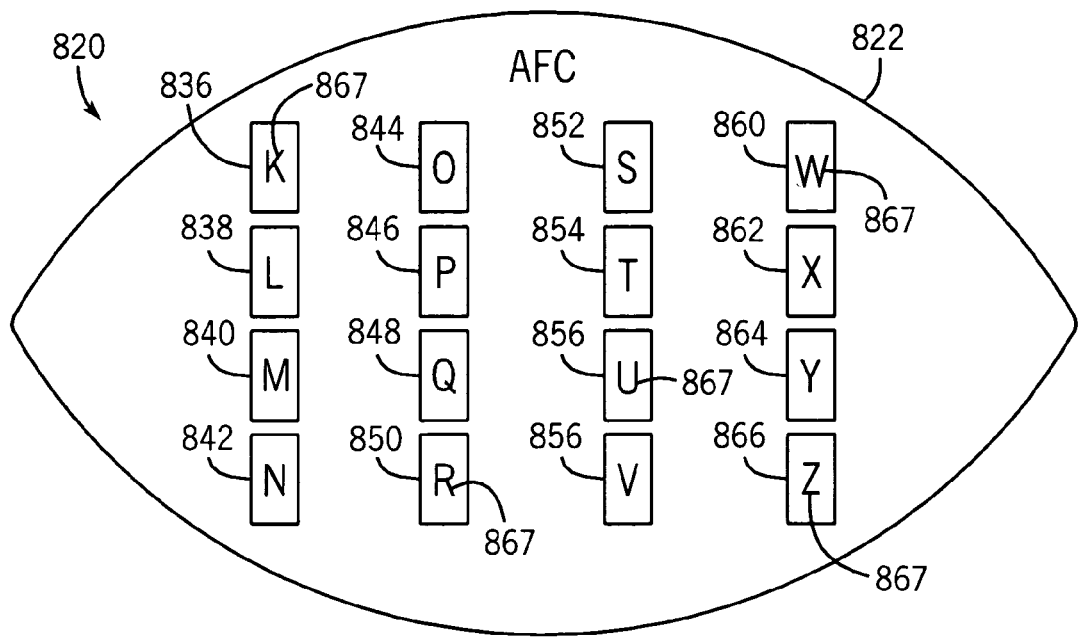
FIG. 11 is a front elevation view schematically illustrating an alternative battery display system.

FIG. 11 is a front elevational view of a battery display system 820. System 820 includes batteries 836-866 and display apparatus 822. Display apparatus 822 generally comprises a structure configured to support each of the batteries 836-866 so as to display the graphics of batteries 836-866. Display apparatus 822 preferably includes one or more graphic components or is shaped so as to be associated with a genus, wherein each of batteries 836-866 includes a graphic associated with a species of the genus. For example, in one embodiment, the genus may comprise a league of sporting teams wherein the species comprise individual teams of the league. In another embodiment, the genus may comprise a team and the species comprise players of the team. Another example of a genus/species arrangement is a football team, wherein the species comprise various other characteristics of the team such as its stadium, its mascot, its championship years, its coach and the like. In another embodiment, the genus may comprise a racing association wherein the species comprises race drivers or racing cars. In another embodiment, the genus may comprise a map of a geographic region (e.g. United States of America), wherein the species comprise individual units of the geographic region (individual states of the United States). In such an application, the graphics provided on the batteries may comprise alphanumeric symbols identifying the species, abstract designs or images associated with the species.

In the particular embodiment shown in FIG. 11, the genus comprises the American Football Conference of the National Football League. Accordingly, the display apparatus 822 has a shape associated with the American Football Conference, a football. Apparatus 822 may additionally include graphics associated with the American Football Conference such as the phrase "AFC". The individual batteries 836 or 866 may have graphics associated with each of the 16 football teams which comprise part of the American Football Conference. Such images may include the names of the football teams, their mascots, their players, their stadiums or various other items, characters or objects associated with the team. In one embodiment, batteries 836-866 are separable from display apparatus 822 and replaceable such that apparatus 822 and batteries 836 or 866 may be used to track the standings of each of the teams in the four divisions of the American Football Conference.

In one embodiment, display apparatus 822 includes battery engaging portions 724 (shown in FIG. 10). Alternatively, other means may be provided for retaining batteries 836-866 in place on apparatus 822. Although less desirable, such battery engaging portions may be omitted wherein apparatus 822 is simply used to market the batteries at the point of retail sale such as when a shrink wrap or cellophane is used to secure the batteries in place against the backing provided by apparatus 822. Although not illustrated, apparatus 822 may include additional battery engaging portions 724 corresponding to playoff brackets. The embodiment shown in FIG. 11 is just one example of the multitude of various genus/species arrangements that may be used for the retail sale of batteries or the use of stored fresh batteries or depleted used batteries.

Batteries 836-866 may additionally be provided with unique serial numbers to facilitate the collection of batteries having different graphics. For example, each year or at a predetermined repeating period, batteries having different images may be sold and collected. As another example, varying predetermined or varying/random amounts of one set of numbered batteries could be made available for sale as compared to another set of numbered batteries, facilitating the collection of batteries having different graphics and different amounts available. In one embodiment, a series of batteries having distinct graphic components and being consecutively numbered (e.g., batteries 1-12) may be sold or marketed, facilitating a desire to collect each and all of the particular series of batteries with the various graphic components.

Batteries 836-866 include graphic components 867 schematically represented by the letters "K"-"Z". The use of such letters merely indicates that the graphic components of batteries 836-866 are visually distinct from one another. Although such letters have been used in describing various other embodiments and systems in FIGS. 1-10, any similarity in the letters utilized is mere coincidence; the mere use of the same letter to represent a graphic component in different figures or different embodiments does not necessarily require the use of the same graphic component between different embodiments or different figures.

FIG. 12 illustrates an electronic product assembly 920 including an electronic component 921 powered by a battery 926. Battery 926 includes an outer surface 934 having a graphic 936 with at least one graphic component 938, schematically represented by the letter "X". Graphic component 938 comprises one or more alpha-numeric symbols, an abstract design or an image. Preferably, graphic component 938 is completely unrelated to characteristics of the battery itself.

Electronic product 921 includes a housing 922 configured to contain battery 926. At least a portion of housing 922 is configured to enable viewing of battery 926 while battery 926 is enclosed within housing 922. In one embodiment shown, housing 922 includes opaque portion 929 and a transparent portion 930. Transparent portion 930 is preferably configured as a window having a size smaller than the size of battery 926 (as identified by broken lines) and appropriately located to enable viewing of graphic component 938. In alternative embodiments, transparent portion 930 may be large enough to enable viewing of the entirety of battery 926. Although less desirable, in still other alternative embodiments, the entire portion of housing 922 proximate to battery 926 may be transparent. In the embodiment shown in FIG. 12, the entire lower end (as defined by that portion of housing 922 extending below the dashed line 940) may be transparent. In other alternative embodiments, the transparent window 930 may alternatively comprise an aperture through housing 922.

Electronic product 921 may comprise any of a variety of conventionally known or future developed electronic components or appliances which are powered by one or more batteries. In one particular embodiment, electronic product 921 includes a video game playing component having a screen 941 and a set of controls 942. Product 921 is configured to display a video graphic 950, schematically represented by the letter "X". Video graphic 950 may comprise a landscape, a character, a map, a design, an image or the like. In the particular embodiment, graphic component 938 of battery 926 is selected so as to be associated with video graphic 950. For example, the video graphic 950 may comprise a certain gaming character wherein graphic component 938 comprises an image of the gaming character. In one embodiment, graphic component 950 may comprise a video program such as a presentation, movie, episode, short story and the like, wherein video graphic 950 comprises a character from the program, a scene from the program and wherein graphic component 938 comprises the corresponding image, character, scene, actor or actress and the like.

In the particular embodiment illustrated, electronic product 921 also includes a sound playing component such as for playing CDs, MP3s and other recordings independently or sound associated with a video being displaying on screen 941. In one embodiment, battery 926 is provided with a graphic component 938 associated with an originator of the sound being played by electronic product 921. For example, battery 926 may include a graphic component 938 associated with a musical artist, a musical group, a literary author, a comedian or an orator. In particular, graphic component 938 may comprise an image of the originator, a phrase associated with the originator, an album cover or other art work associated with the originator and the like.

Although electronic product 921 is illustrated as including both a video playing component and a sound playing component, electronic product 921 may alternatively include only a video playing component or only a sound playing component. Electronic product 921 may comprise a dedicated product for providing only a sound playing component or a video playing component or may comprise a multi-function electronic product providing additional functions such as part of a PDA, a cell phone including a video playing component or a sound playing component or various other conventionally known or future developed electronic products which combine a sound playing component or a video playing component with other functions.

FIG. 13 is a top elevational view schematically illustrating a marketing bundle 1020 including a media 1022, batteries 1024, 1026 and packaging 1032. Media 1022 comprises any conventionally known or future developed medium containing a recording of at least one sound, graphic or video. Media 1022 may comprise a CD, a DVD, a tape and the like. Media 1022 is generally configured to be played in an electronic product that is powered by batteries and that reproduces the recorded sound, image or video. In the particular embodiment illustrated, media 1022 includes graphic components 1038 and 1040. Graphic component 1038 generally comprises alpha-numeric symbols forming the name of the sound, image or video or portions of the sound, image or video recorded on the media 1022, images of originators of the sound, image or video such as the author, director, producer, singer, musical group, author, orator or the like. Graphic component 1030 may also comprise images of a character, scene or story line associated with the video, image or sound. Likewise, graphic component 1030 may comprise song lyrics or general album or song covers with various copyrighted artist works. Graphic component 1040 generally comprises one or more alpha-numeric symbols further identifying the author of the copyrighted material on media 1022 or the source of media 1022.

Batteries 1024 comprise conventionally known or future developed batteries such as size A, AA, AAA, C, D or E batteries. Batteries 1024 and 1026 are preferably configured for powering an electronic product configured to reproduce the sound, image or video recorded on media 1022. Batteries 1024 and 1026 each include an outer surface having a graphic including graphics 1040 and 1042, respectively. Graphic 1040 includes graphic components 1044 and 1046. Graphic 1042 of battery 1026 includes graphic components 1046 and 1048. Graphic components 1044 and 1048 are visually distinct from one another. Graphic component 1044 preferably comprises one or more alpha-numeric symbols, an abstract design or an image unrelated to the characteristics of battery 1024. Graphic component 1044 preferably comprises at least one alpha-numeric symbol, an abstract design or an image identical to graphic component 1038. For example, in one embodiment, graphic component 1038, schematically represented by the letter "Y", may comprise an image of a musical group whose music is recorded on media 1022, wherein graphic component 1044 also comprises an image of the same musical group. Alternatively, graphic component 1044 may comprise a symbol, name, slogan or the like associated with the musical group. Graphic component 1038 may comprise an album title or an album cover, wherein graphic component 1044 comprises the same album title, the same album cover artist copyrighted work.

Like graphic component 1044, graphic component 1048 of battery 1026 preferably comprises at least one alpha-numeric symbol, an abstract design or an image not associated with characteristics of battery 1026 itself. In the preferred embodiment illustrated, graphic component 1048 is associated with graphic component 1040 of media 1022. Although less desirable, graphic components 1044 and 1048 may alternatively be identical to one another.

Graphic components 1046 are provided on the outer surface of each of batteries 1024 and 1026. Graphic components 1046 generally comprise indicia identifying a source of batteries 1024 and 1026. In the particular embodiment illustrated, graphic components 1046 of batteries 1024 and 1026 are identical to one another in that the source of both batteries 1024 and 1026 is identical.

Packaging 1032 binds media 1022 and batteries 1024, 1026 into a single package or bundle for retail sale. As a result, marketing bundle 1020 facilitates the targeting of the sale of batteries 1024 and 1026 to those users or purchasers of media 1022. Packaging 1032 preferably includes transparent portions adjacent to graphic components 1038, 1044 and 1048 to enable viewing of such graphic components.

FIG. 14 is a top elevational view schematically illustrating a marketing bundle 1120, including product 1122, batteries 1124, 1126, and packaging 1132. Product 1122 generally comprises any conventionally known or future developed product, such as a toy, or any other consumer article. Graphic component 1138, schematically represented by the letter "P", is formed upon or applied to product 1122 and is associated with product 1122. In the particular embodiment, product 1122 comprises a product that is configured to utilize batteries 1124 and 1126. In another embodiment, product 1122 does not require batteries.

Batteries 1124 and 1126 preferably comprise domestic batteries having graphic components 1146 and 1148, respectively. Graphic components 1146 and 1148 are generally related to associated with product 1122 and preferably related to or associated with graphic component 1138. In the particular embodiment illustrated, graphic components 1146 and 1148 comprise distinct graphic components on the outer surface of batteries 1124 and 1126. In alternative embodiments, batteries 1124 and 1126 may be provided with common graphic components.

In still alternative embodiments, batteries 1124 and 1126 may be provided with unique or distinct scents or smells by applying scented material upon the surface of batteries 1124 and 1126. Such scented material may be continuously active in nature or may be selectively active. An example of a selectively active scent material would be a conventionally known scratch-and-sniff applique that may be adhered to the surface of battery 1124 or battery 1126. This scent would preferably be associated or related to product 1122.

In still another embodiment, batteries 1124 and 1126 may have surfaces which are provided with distinct textures or surface contours. In contrast to conventional batteries which are generally smooth along their exterior surface, batteries 1124 and 1126 may be provided with dimples, raised and depressed portions, tacky portions, fabric portions, bumpy portions, fuzzy portions, compressible portions, elastic portions and the like. Such textures are preferably associated with product 1122. Such textures are provided by applying one or more materials or layers to the exterior surface of batteries 1124 and 1126, wherein the materials or layers provide the desired texture.

Packaging 1132 combines product 1122 and batteries 1124 and 1126 together at the point of retail sale. In the particular embodiment illustrated, packaging 1132 includes paperboard backing card, and at least partially transparent or semi-transparent enclosure capturing and retaining products 1122 and batteries 1124, 1126 against the card. As a result, graphic components 1146 and 1148 are simultaneously displayed or contained within packaging 1132. In one embodiment, the enclosement (made from transparent shrink wrap or a rigid, transparent polymer) also allows viewing of graphic component 1138. In alternative embodiments, packaging 1132 may be made of a relatively opaque material, wherein batteries 1124 and 1126 are depicted on a surface of packaging 1132. Graphic components 1146 and 1148 comprise alphanumeric symbols, images or abstract designs unrelated to the characteristics of the batteries themselves.

FIGS. 15-17 illustrate various packaging and storage bundles configured to identify an ideal use for one or more batteries. FIG. 15 illustrates bundle 1220 including batteries 26, 28 (described and discussed above with respect to FIGS. 1 and 2) and packaging 1232. In the particular embodiment illustrated, batteries 26 and 28 are configured for ideal use in a particular end use electronic product corresponding to the configuration of packaging 1232 (shown as a flashlight).

Packaging 1232 is generally configured in the shape of the end use product for which batteries 26 and 28 are ideally suited. In the particular embodiment illustrated packaging 1232 is in the form of a flashlight. In one embodiment, packaging 1232 is at least partially 3-dimensional in that packaging 1232 includes a tubular portion 1240 in which batteries 26 and 28 are received in an end-to-end relationship. In the embodiment illustrated, tubular portion 1240 is generally cylindrical and batteries 26 and 28 are also generally cylindrical in shape. In the particular embodiment illustrated, tubular portion 1240 is formed from a transparent polymeric material enabling batteries 26 and 28 to be viewed from approximately at least 360 degrees. Although tubular portion 1240 preferably has an outer surface that is molded so as to be textured and to have contours or features (such as feature 1241 representing an on/off switch), tubular portion 1240 may alternatively be smooth.

As further shown by FIG. 15, packaging 1232 additionally includes bulb portion 1244. Bald portion 1244 represents the head or bulb portion of a flashlight. In one particular embodiment, head portion 1244 comprises a cover or cap which is threaded onto tubular portion 1240 and contains batteries 26 and 28 therein. In another embodiment, head 1244 is integrally formed as part of a single unitary body with tubular portion 1240 so as to also enclose batteries 26 and 28. Head portion 1244 may further receive an additional battery. In yet another embodiment, head portion 1244 may simply comprise a relatively flat panel (formed from plastic or paperboard) which includes graphic components corresponding to the head portion of a conventional flashlight. In such an embodiment, head portion 1244 may additionally be provided with a hang hole for hanging packaging 1232 at a point of retail sales. In yet another embodiment, packaging 1232 may comprise a single back panel having the general outline of an electronic product such as a flashlight, wherein batteries 26 and 28 are secured to a front of the back panel at the general locations in which the batteries would be positioned within an actual flashlight. Such attachment may be achieved by shrink wrap, retaining bands and the like.

Although batteries 26 and 28 are illustrated as having distinct graphic components 38 and 48, respectively, batteries 26 and 28 may alternatively have common graphic components. Such graphic components may be related or unrelated to the characteristics of the battery. In one embodiment, graphic components 38 and 48 are related or associated with the characteristics of the electronic product.

FIGS. 16 and 17 illustrate bundle 1320. FIG. 16 is a front elevational view schematically illustrating bundle 1320, while FIG. 17 is a side elevational view schematically illustrating bundle 1320. Bundle 1320 generally includes batteries 26 and housing 1332. Batteries 26 are described above with respect to FIG. 1. Although batteries 26 are described as having a graphic component 38 (shown in FIG. 1), batteries 26 may alternatively comprise conventionally known batteries generally including only graphic components which are related to the characteristics of the battery itself. Batteries 26 are ideally suited for use in a particular end use electronic product corresponding to a configuration of housing 1332 as described hereafter.

Housing 1332 generally comprises a packaging configured in the form of an end use product ideally suited for using batteries 26 contained therein. In the particular embodiment, housing 1332 is configured in the form of a boom box. In the particular embodiment illustrated, housing 1332 is preferably configured for containing batteries 26 at a point of retail sale, as well as the storing batteries 26 of the consumer. To this end, housing 1332 includes base portion 1340 and a selectively openable or closable or releasable cover portion 1342. Cover portion 1342 is preferably pivotally coupled to base portion 1340 about hinge 1343 for movement in the direction indicated by arrow 1344 so as to act as a door. In other embodiments, cover portion 1342 may be configured to slide relative to base portion 1340 between the closed state and the open state so as to provide access to batteries 26 contained within housing 1332. In still alternative embodiments, cover portion 1342 may be snapped fit upon base portion 1340 and may be removably coupled to base portion 1340 by other conventionally known or future developed mechanisms. Although cover portion 1340 preferably has a face forming a front of housing 1332, cover portion 1342 may alternatively form a back of housing 1332.

At least portions of housing 1332 are preferably configured so as to enable batteries 26 to be viewed while contained within housing 1332. In one embodiment, housing 1332 includes apertures enabling the viewing of batteries 26. In another embodiment, portions of housing 1332 were made from a transparent or semi-transparent material such as a transparent polymeric material. In one embodiment, substantially the entirety of housing 1332 is transparent. In another embodiment, only selected portions of housing 1332 are transparent. In one embodiment, housing 1332 is provided with a regular surface having contours or shapes representing an end use electronic product (boom box). In another embodiment, housing 1332 includes graphics which are formed or otherwise applied to an exterior of housing 1332. Examples of such include labels, stickers, and the like, representing speakers, dials, controls, and displays of the simulated electronic product 1332. Although less desirable, housing 1332 may alternatively comprise a clam-shell structure surrounding batteries 26, at least a portion of which resembles an end-use electronic product. For example, housing 1332 may have a front portion corresponding to a boom box and a rear portion affixed to or integrally formed as part of a single unitary body with the front portion which simply corresponds to the cylindrical shape of batteries 26. In one embodiment, housing 1332 may generally comprise a generally flat panel or card formed from paperboard or plastic resembling the end-use electronic product and possibly having graphics further resembling the end-use electronic product while batteries 26 are retained along a back side of the panel by an encasement, bands or other retaining structures. Such a clam-shell structure may be resealable or may be generally a one-time use structure for displaying the batteries at a point of sale.

Bundles 1220 and 1320 illustrated in FIGS. 15-17 easily indicate to the consumer an ideal use of the batteries contained therein. In particular embodiments, packaging 1232 or container 1332 further provide an attractive unique storage structure for storing the batteries prior to use or potentially even after the batteries have been exhausted such-as when batteries have one or more graphic components targeted to the consumer and unrelated to the characteristics of the battery itself as described above.

Although the present invention has been described with reference to preferred embodiments, workers skilled in the art will recognize that changes may be made in form and detail without departing from the spirit and scope of the invention. For example, although different preferred embodiments may have been described as including one or more features providing one or more benefits, it is contemplated that the described features may be interchanged with one another or alternatively be combined with one another in the described preferred embodiments or in other alternative embodiments. Because the technology of the present invention is relatively complex, not all changes in the technology are foreseeable. The present invention described with reference to the preferred embodiments and set forth in the claims is manifestly intended to be as broad as possible. For example, unless specifically otherwise noted, the claims reciting a single particular element also encompass a plurality of such particular elements.

What is claimed:

1. A battery bundle comprising:
    a first battery having a first outer surface with a first graphic;
    a second battery substantially identical to the first battery in all respects except that the second battery has a second outer surface with a second graphic distinct from the first graphic; and
    a packaging binding the first battery and the second battery, wherein the packaging has a first aperture adjacent to the first battery and a second aperture adjacent the second battery, wherein the first aperture and the second aperture are configured to facilitate rotation of the first battery and the second battery, respectively, while within the packaging and wherein the first battery and the second battery are electrically isolated from one another while within the packaging.

2. The battery bundle of claim 1, wherein the packaging has at least one transparent portion adjacent to at least portions of the first graphic and the second graphic.

3. The battery bundle of claim 2, wherein the at least one transparent portion extends substantially completely about the first outer surface and the second outer surface.

4. The battery bundle of claim 3, wherein the first battery and the second battery are substantially aligned end-to-end in the packaging.

5. The battery bundle of claim 4, wherein the battery bundle includes batteries in addition to the first battery and the second battery and wherein all of the batteries bound by the packaging are aligned end-to-end in the packaging.

6. The battery bundle of claim 5, wherein the packaging includes a tube containing all of the batteries.

7. The battery bundle of claim 3, wherein the packaging includes batteries in addition to the first battery and the second battery and wherein the packaging includes at least one tube binding all of the batteries in an end-to-end relationship.

8. The battery bundle of claim 1 including batteries in addition to the first battery and the second battery, wherein all of the batteries bound in the packaging are substantially identical to one another except that at least two of the batteries have outer surfaces with distinct graphics.

9. The battery bundle of claim 1, wherein the packaging includes a flexible membrane configured to engage at least one of the first battery and the second battery to facilitate rotation of at least one of the first battery and the second battery.

10. The battery bundle of claim 1, wherein the first battery and the second battery have at least one of a distinct smell or a distinct outer surface texture.

11. The battery bundle of claim 1, wherein at least one of the first graphic and the second graphic are selected from the group including: cartoon characters, entertainment personalities, sporting figures, cars, sporting equipment, well-known phrases, clichés, barbershop stripes, artwork, paper and coin currency, gaming characters, music media artwork, movie media artwork, advertising for non-battery goods or services, motivational sayings, flags, inspirational sayings, humorous sayings, campaign slogans, sayings, or representations or reproductions of images (finger, cigarette, money roll) not previously related to a battery and/or its use.

12. The battery bundle of claim 1, wherein the packaging includes a film configured to maintain it shape only when the batteries are in place.

13. The battery bundle of claim 1, wherein the packaging includes a support portion configured to support the battery bundle with respect to a display.

14. The battery bundle of claim 13, wherein the support portion includes a pedestal.

15. The battery bundle of claim 1, wherein the first battery and the second battery are a same brand of battery.

16. The battery bundle of claim 1, wherein the first graphic and the second graphic have distinct graphic components comprising distinct images not associated with trademarks or trade dress.

17. The battery bundle of claim 1, wherein the first graphic and the second graphic include graphic components comprising distinct images, wherein the images are selected from a group of images consisting of: a physical likeness or representation of a person, animal, fictional character, landscape, scenery, object or something in actual or imagined existence.

18. The battery bundle of claim 1, wherein the first graphic includes a first graphic component and wherein the second graphic includes a second graphic component distinct from the first graphic component, wherein the first graphic component and the second graphic component do not identify a manufacturer, distributor or retailer of the battery, do not describe a size or power characteristic of the battery, do not describe a composition of the battery, do not describe a polarity of the battery, are not associated with information regarding a useful life of the battery and are not associated with warnings about the usage or disposal of the battery.

19. The battery bundle of claim 1, wherein the first graphic includes a first graphic component and wherein the second graphic includes a second graphic component distinct from the first graphic component, wherein the first graphic component and the second graphic component do not identify a manufacturer, distributor or retailer of the battery, that do not describe a size or power characteristic of the battery, that do not identify an intended or suggested use of the battery such as identifying a type of electronic gadget or appliance in which the battery may be used, that do not describe a composition of the battery, that do not describe a polarity of the battery, that are not associated with information regarding the useful life of the battery, that are not associated with warnings about the usage or disposal of the battery, that do not identify intellectual property associated with the battery (for example, a patent number, a patent pending notification, a trademark symbol (™,®), a copyright symbol (©)), and do not provide information regarding the recyclability of the battery.

20. The battery bundle of claim 1, wherein the first graphic includes a first graphic component extending 360 degrees about an outer surface of the first battery and wherein the second graphic includes a second graphic component distinct from the first graphic component and extending through 360 degrees about an outer surface of the second battery.

21. The battery bundle of claim 1, wherein the first graphic includes a first graphic component at a first location on an outer surface of the first battery and wherein the second graphic includes a second graphic component distinct from the first graphic component at a second location on an outer surface of the second battery and corresponding to the first location.

22. The battery bundle of claim 21, wherein the first battery and the second battery are a same brand of battery.

23. The battery bundle of claim 22, wherein the first graphic component and the second graphic component do not identify a manufacturer, distributor or retailer of the battery, that do not describe a size or power characteristic of the battery, that do not identify an intended or suggested use of the battery such as identifying a type of electronic gadget or appliance in which the battery may be used, that do not describe a composition of the battery, that do not describe a polarity of the battery, that are not associated with information regarding the useful life of the battery, that are not associated with warnings about the usage or disposal of the battery, that do not identify intellectual property associated with the battery, a patent number, a patent pending notification, a trademark symbol (™,®), a copyright symbol (©); and do not provide information regarding the recyclability of the battery.

24. The battery bundle of claim 1, wherein the first graphic is associated with a first species of a genus and wherein the second graphic is associated with a second species of the genus.

25. The battery bundle of claim 1, wherein the first graphic and the second graphic are configured such that alignment of the first graphic and the second graphic forms at least a portion of a first composite graphic.

26. The battery bundle of claim 1, wherein the first battery and the second battery have distinct scented materials.

27. The battery bundle of claim 26, wherein the scented materials are selectively active.

28. The battery bundle of claim 1, wherein the first graphic and the second graphic include graphic components comprising distinct images, wherein the images are selected from a group of images consisting of: a physical likeness or representation of a person, animal, fictional character, landscape, scenery, object or something in actual or imagined existence and wherein the graphic components are not associated with trademarks or trade dress.

29. The battery bundle of claim 1, wherein the first battery and the second battery have longitudinal axes non-coincident and parallel to one another.

30. The battery bundle of claim 1, wherein the first aperture extends along a circumferential side of the first battery and wherein the second aperture extends along a circumferential side of the second battery.

31. The battery bundle of claim 1, wherein the first battery extends along an axis and wherein the packaging includes a wall extending across and intercepting the axis.

32. A battery bundle comprising:
a first battery having a first outer surface with a first graphic;
a second battery substantially identical to the first battery in all respects except that the second battery has a second outer surface distinct from the first outer surface, the second outer surface having a second graphic distinct from the first graphic; and
a packaging binding the first battery and the second battery, wherein circumferential sides of each of the first battery and the second battery are exposed through the packaging to facilitate rotation of the first battery and a second battery while within the packaging and wherein the first battery and the second battery are electrically isolated from one another while within the packaging.

33. The battery bundle of claim 32, wherein the packaging has at least one transparent portion adjacent to at least portions of the first graphic and the second graphic.

34. The battery bundle of claim 32, wherein the at least one transparent portion extends substantially completely about the first outer surface and the second outer surface.

35. The battery bundle of claim 34, wherein the first battery and the second battery are substantially aligned end-to-end in the packaging.

36. The battery bundle of claim 35, wherein the battery bundle includes batteries in addition to the first battery and the second battery and wherein all of the batteries bound by the packaging are aligned end-to-end in the packaging.

37. The battery bundle of claim 36, wherein the packaging includes a tube containing all of the batteries.

38. The battery bundle of claim 34, wherein the packaging includes batteries in addition to the first battery and the second battery and wherein the packaging includes at least one tube binding all of the batteries in an end-to-end relationship.

39. The battery bundle of claim 32, wherein the packaging has at least one aperture adjacent to at least portions of the first graphic and the second graphic.

40. The battery bundle of claim 32 including batteries in addition to the first battery and the second battery, wherein all of the batteries bound in the packaging are substantially identical to one another except that at least two of the batteries have outer surfaces with distinct graphics.

41. The battery bundle of claim 32, wherein the packaging includes a flexible membrane configured to engage at least one of the first battery and the second battery to facilitate rotation of at least one of the first battery and the second battery.

42. The battery bundle of claim 32, wherein the first battery and the second battery have at least one of a distinct smell or a distinct outer surface texture.

43. The battery bundle of claim 32, wherein at least one of the first graphic and the second graphic are targeted towards a specific group of consumers.

44. The battery bundle of claim 32, wherein at least one of the first graphic and the second graphic are selected from the group including: cartoon characters, entertainment personalities, sporting figures, cars, sporting equipment, well-known phrases, clichés, barbershop stripes, artwork, paper and coin currency, gaming characters, music media artwork, movie media artwork, advertising for non-battery goods or services, motivational sayings, flags, inspirational sayings, humorous sayings, campaign slogans, sayings, or representations or reproductions of images (finger, cigarette, money roll) not previously related to a battery and/or its use.

45. The battery bundle of claim 32, wherein the packaging is configured to bind the batteries for retail distribution.

46. The battery bundle of claim 32, wherein the packaging includes a film configured to maintain it shape only when the batteries are in place.

47. The battery bundle of claim 32, wherein the packaging includes a support portion configured to support the battery bundle with respect to a display.

48. The battery bundle of claim 47, wherein the support portion includes a hang hole.

49. The battery bundle of claim 47, wherein the support portion includes a pedestal.

50. The battery bundle of claim 32, wherein the first battery and the second battery are a same brand of battery.

51. The battery bundle of claim 32, wherein the first graphic and the second graphic have distinct graphic components comprising distinct images not associated with trademarks or trade dress.

52. The battery bundle of claim 32, wherein the first graphic and the second graphic include graphic components comprising distinct images, wherein the images are selected from a group of images consisting of: a physical likeness or representation of a person, animal, fictional character, landscape, scenery, object or something in actual or imagined existence.

53. The battery bundle of claim 32, wherein the first graphic includes a first graphic component and wherein the second graphic includes a second graphic component distinct from the first graphic component, wherein the first graphic component and the second graphic component do not identify a manufacturer, distributor or retailer of the battery, do not describe a size or power characteristic of the battery, do not describe a composition of the battery, do not describe a polarity of the battery, are not associated with information regarding a useful life of the battery and are not associated with warnings about the usage or disposal of the battery.

54. The battery bundle of claim 32, wherein the first graphic includes a first graphic component and wherein the second graphic includes a second graphic component distinct from the first graphic component, wherein the first graphic component and the second graphic component do not identify a manufacturer, distributor or retailer of the battery, that do not describe a size or power characteristic of the battery, that do not identify an intended or suggested use of the battery such as identifying a type of electronic gadget or appliance in which the battery may be used, that do not describe a composition of the battery, that do not describe a polarity of the battery, that are not associated with information regarding the useful life of the battery, that are not associated with warnings about the usage or disposal of the battery, that do not identify intellectual property associated with the battery (for example, a patent number, a patent pending notification, a trademark symbol (™,®), a copyright symbol (©)), and do not provide information regarding the recyclability of the battery.

55. The battery bundle of claim 32, wherein the first graphic includes a first graphic component extending 360 degrees about an outer surface of the first battery and wherein the second graphic includes a second graphic component distinct from the first graphic component and extending through 360 degrees about an outer surface of the second battery.

56. The battery bundle of claim 32, wherein the first graphic includes a first graphic component at a first location on an outer surface of the first battery and wherein the second graphic includes a second graphic component distinct from the first graphic component at a second location on an outer surface of the second battery and corresponding to the first location.

57. The battery bundle of claim 56, wherein the first battery and the second battery are a same brand of battery.

58. The battery bundle of claim 57, wherein the first graphic component and the second graphic component do not identify a manufacturer, distributor or retailer of the battery, that do not describe a size or power characteristic of the battery, that do not identify an intended or suggested use of the battery such as identifying a type of electronic gadget or appliance in which the battery may be used, that do not describe a composition of the battery, that do not describe a polarity of the battery, that are not associated with information regarding the useful life of the battery, that are not associated with warnings about the usage or disposal of the battery, that do not identify intellectual property associated with the battery, a patent number, a patent pending notification, a trademark symbol (™,®), a copyright symbol (©); and do not provide information regarding the recyclability of the battery.

59. The battery bundle of claim 32, wherein the first graphic is associated with a first species of a genus and wherein the second graphic is associated with a second species of the genus.

60. The battery bundle of claim 32, wherein the first surface of the first battery and a second surface of the second battery have distinct surface textures and wherein the distinct surface textures are selected from textures consisting of: dimples, raised and depressed portions, tacky portions, fabric portions, bumpy portions, fuzzy portions, compressible portions, and elastic portions.

61. The battery bundle of claim 32, wherein the first battery and the second battery have distinct scented materials.

62. The battery bundle of claim 61, wherein the scented materials are selectively active.

63. The battery bundle of claim 32, wherein the first graphic and the second graphic include graphic components comprising distinct images, wherein the images are selected from a group of images consisting of: a physical likeness or representation of a person, animal, fictional character, landscape, scenery, object or something in actual or imagined existence and wherein the graphic components are not associated with trademarks or trade dress.

64. The battery bundle of claim 32, wherein the first battery and the second battery have longitudinal axes non-coincident and parallel to one another.

65. The battery bundle of claim 32, wherein the packaging has a first aperture adjacent to the first battery and a second capture adjacent the second battery, wherein the first aperture and the second aperture are configured to facilitate rotation of the first battery and the second battery, respectively, while within the packaging.

66. The battery bundle of claim 65, wherein the first aperture extends along a circumferential side of the first battery and wherein the second aperture extends along a circumferential side of the second battery.

67. The battery bundle of claim 32, wherein the first battery extends along an axis and wherein the packaging includes a wall extending across and intercepting the axis.

68. The battery bundle of claim 67, wherein the first graphic includes a first graphic component and wherein the second graphic includes a second graphic component distinct from the first graphic component, wherein the first graphic component and the second graphic component do not identify a manufacturer, distributor or retailer of the battery, do not describe a size or power characteristic of the battery, do not describe a composition of the battery, do not describe a polarity of the battery, are not associated with information regarding a useful life of the battery and are not associated with warnings about the usage or disposal of the battery.

69. The battery bundle of claim 68, wherein the packaging is configured to bind the batteries for retail distribution.

70. The battery bundle of claim 68, wherein the packaging has at least one transparent portion adjacent to at least portions of the first graphic and the second graphic.

71. The battery bundle of claim 70, wherein the first battery and the second battery are substantially aligned end-to-end in the packaging such that their axes are substantially coincident.

72. The battery bundle of claim 70, wherein the packaging includes a tube encircling the first battery and the second battery.

73. The battery bundle of claim 32, wherein at least one of the first graphic and the second graphic are targeted towards a specific group of consumers, wherein the specific group of consumers is selected from a group of consumers consisting of a group based upon gender, based upon age or age characteristics, based upon geographical regions of the consumers, based upon the jobs or professions of the consumers, based on the education level of the consumers, based upon participatory hobbies (participation in athletics such as biking, football, jogging, skateboarding, collecting, hunting, working out/body building, playing cards, playing bingo, camping, motorcycle riding), social clusters, demographics, ethnicities, religions, nationalities, observational hobbies (interests in observational participation in distinct forms of entertainment such as watching sports, TV, concerts, movies, plays, pornography, political shows or events), social behavior (fine wine, cigars, fashion preference, gambling, sex, sexual preference or behavior, adult entertainment, bars, dance clubs), habitual behavior (smoking, drinking, drug use), clubs/memberships/affiliations (fraternities, Kiwanis, Harley Davidson owners, sports team, musical group, thespian, religious subchapter, alcoholics anonymous, YMCA, pro-life, political party or cause), physical characteristics (hair color, muscularity, hair style, weight, attractiveness, skin color).

74. The battery bundle of claim 32, wherein the first graphic and the second graphics comprise distinct portions of a series or related theme.

75. The battery bundle of claim 74, wherein the series depicts a plot or storyline.

76. The battery bundle of claim 32, wherein the first graphic and the second graphic comprise distinct portions of an individual word or phrase such that when a series of batteries, including the first battery and the second battery are positioned side-by side, the individual word or phrase may be formed.

77. A battery bundle comprising:
a first battery having a first outer surface with a first graphic;
a second battery substantially identical to the first battery in all respects except that the second battery has a second outer surface with a second graphic distinct from the first graphic; and
a packaging binding the first battery and the second battery, wherein the packaging has at least one transparent portion adjacent to at least portions of the first graphic and the second graphic and extending substantially completely about the first outer surface and the second outer surface, wherein the packaging includes batteries in addition to the first battery and the second battery and wherein the packaging includes a plurality of tubes binding all of the batteries in an end-to-end relationship and wherein the first battery and the second battery are electrically isolated from one another while within the packaging.

78. A battery bundle comprising:
a first battery having a first outer surface with a first graphic;
a second battery substantially identical to the first battery in all respects except that the second battery has a second outer surface with a second graphic distinct from the first graphic; and
a packaging binding the first battery and the second battery, wherein the packaging has a first aperture adjacent to the first battery and a second aperture adjacent the second battery, wherein the first aperture and the second aperture are configured to facilitate rotation of the first battery and the second battery, respectively, while within the packaging, wherein at least one transparent portion extends substantially completely about the first outer surface and the second outer surface.

79. A battery bundle comprising:
a first battery having a first outer surface with a first graphic;
a second battery substantially identical to the first battery in all respects except that the second battery has a second outer surface distinct from the first outer surface, the second outer surface having a second graphic distinct from the first graphic; and
a packaging binding the first battery and the second battery, wherein circumferential sides of each of the first battery and the second battery are exposed through the packaging to facilitate rotation of the first battery and the second battery while within the packaging, wherein the packaging includes a film configured to maintain its shape only when the batteries are in place.

80. A battery bundle comprising:
a first battery having a first outer surface with a first graphic;
a second battery substantially identical to the first battery in all respects except that the second battery has a second outer surface distinct from the first outer surface, the second outer surface having a second graphic distinct from the first graphic; and a packaging binding the first battery and the second battery, wherein circumferential sides of each of the first battery and the second battery are exposed through the packaging to facilitate rotation of the first battery and the second battery while within the packaging, wherein the packaging seals about the batteries such that the batteries cannot be removed without damaging the packaging.

81. The battery bundle of claim 80, wherein the packaging is formed entirely from one or more dielectric materials.

82. The battery bundle of claim 80, wherein the first battery and the second battery are electrically isolated from one another while within the packaging.

* * * * *